United States Patent
Schroeder

(10) Patent No.: US 7,153,070 B1
(45) Date of Patent: Dec. 26, 2006

(54) DRILL BIT GUIDE FOR A HAND-HELD DRILL

(75) Inventor: Thaddeus Schroeder, 642 Allston Dr., Rochester Hills, MI (US) 48309

(73) Assignees: Thaddeus Schroeder, Rochester Hills, MI (US); Peter D. Keefe, Roseville, MI (US)

( * ) Notice: Subject to any disclaimer, the term of this patent is extended or adjusted under 35 U.S.C. 154(b) by 26 days.

(21) Appl. No.: 10/934,279

(22) Filed: Sep. 3, 2004

(51) Int. Cl.
B23B 47/28 (2006.01)

(52) U.S. Cl. .............................. 408/115 R; 408/241 B; 269/87.3

(58) Field of Classification Search .............. 408/72 B, 408/97, 115 B, 115 R, 241 B; 269/87.3, 269/268, 269, 270
See application file for complete search history.

(56) References Cited

U.S. PATENT DOCUMENTS

| | | | | |
|---|---|---|---|---|
| 1,212,634 A * | 1/1917 | Hathaway | ..................... | 82/1.3 |
| 2,008,436 A * | 7/1935 | Cross | .......................... | 408/110 |
| 2,418,956 A * | 4/1947 | Silver | ........................... | 408/97 |
| 2,831,376 A | 4/1958 | Daniels | | |
| 3,381,551 A * | 5/1968 | Lavering et al. | ........... | 408/72 R |
| 3,534,639 A | 10/1970 | Treichler | | |
| 3,575,519 A * | 4/1971 | Bruner et al. | .................. | 408/97 |
| 3,626,513 A | 12/1971 | Pytlak | | |
| 3,661,469 A * | 5/1972 | Leff et al. | .................. | 408/72 R |
| 3,890,058 A | 6/1975 | Self et al. | | |
| 3,907,452 A * | 9/1975 | Tripp | .......................... | 408/56 |
| 4,162,065 A * | 7/1979 | Rea | .............................. | 269/294 |
| 4,199,283 A | 4/1980 | Perry | | |
| 4,257,166 A | 3/1981 | Barker et al. | | |
| 4,280,776 A * | 7/1981 | Chaconas et al. | ......... | 408/72 R |
| D268,165 S * | 3/1983 | Perry et al. | ..................... | D8/70 |
| 4,375,341 A * | 3/1983 | Schulze | .................... | 408/72 R |
| 4,391,558 A | 7/1983 | Perry | | |
| 4,765,786 A * | 8/1988 | Krogh | ......................... | 408/110 |
| 4,842,453 A | 6/1989 | Raines et al. | | |
| 4,896,663 A * | 1/1990 | Vandewalls | ................... | 606/79 |
| D313,189 S * | 12/1990 | Walsh | ........................ | D10/62 |
| 5,108,241 A * | 4/1992 | Coss | ........................ | 408/72 B |
| 5,207,681 A * | 5/1993 | Ghadjar et al. | ............... | 606/96 |
| 5,322,396 A | 6/1994 | Blacker | | |
| 5,415,502 A * | 5/1995 | Dahlin | ..................... | 408/72 B |
| 5,595,193 A * | 1/1997 | Walus et al. | ................. | 128/898 |
| 5,630,683 A * | 5/1997 | Smith | .......................... | 408/67 |
| 5,758,996 A * | 6/1998 | Loudon | .................... | 408/72 B |
| 5,797,708 A * | 8/1998 | Bencic | ........................ | 408/112 |
| 5,800,099 A * | 9/1998 | Cooper | ........................ | 408/1 R |
| 5,947,656 A * | 9/1999 | Simson et al. | ................. | 408/97 |
| 6,116,826 A | 9/2000 | Benway | | |

(Continued)

FOREIGN PATENT DOCUMENTS

WO    WO 200074884 A1 * 12/2000

Primary Examiner—Monica Carter
Assistant Examiner—Michael W. Talbot
(74) Attorney, Agent, or Firm—Peter D. Keefe

(57) ABSTRACT

A simple and inexpensive hand-held drill bit guide that can be conveniently used with electrically powered hand-held drills to provide a precisely perpendicular orientation angle with respect to the surface of an article to be drilled, wherein the surface may be flat, cornered or otherwise generally non-planar, e.g. convex, concave, cylindrical, etc. The drill bit guide has first and second guidance members, wherein a guidance hole communicates therewith in perpendicular relation thereto for guiding a bit inserted thereinto with respect to a surface of an article interfaced with one of the first and second guidance members such that always the guidance hole will be oriented perpendicularly with respect to the surface.

12 Claims, 2 Drawing Sheets

U.S. PATENT DOCUMENTS 6,266,890 B1 * 7/2001 Sova .......................... 33/638
6,394,713 B1 * 5/2002 Yates, Sr. ............... 408/115 R
2005/0254911 A1 * 11/2005 Rooney .................. 408/115 R

* cited by examiner

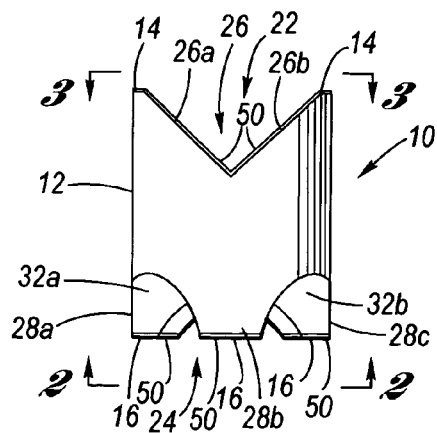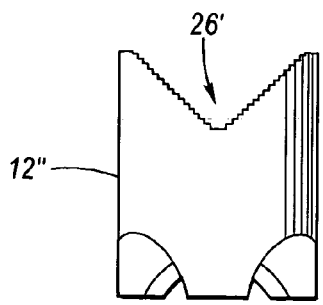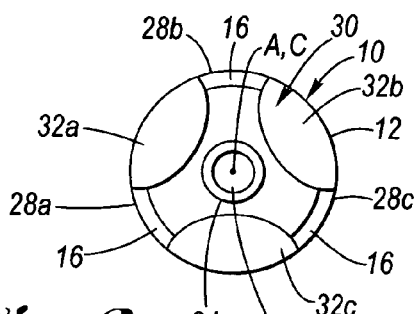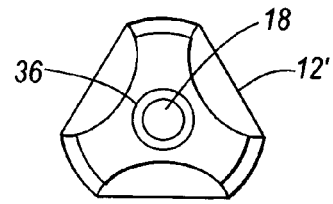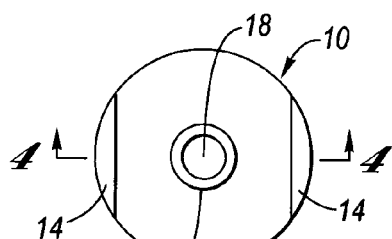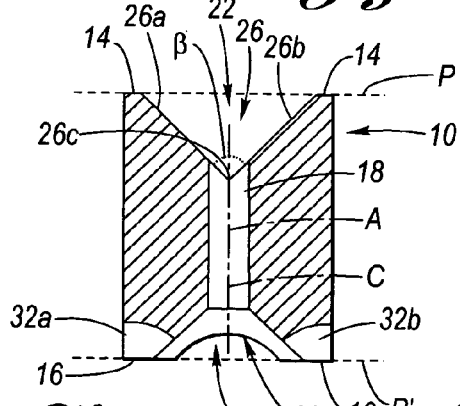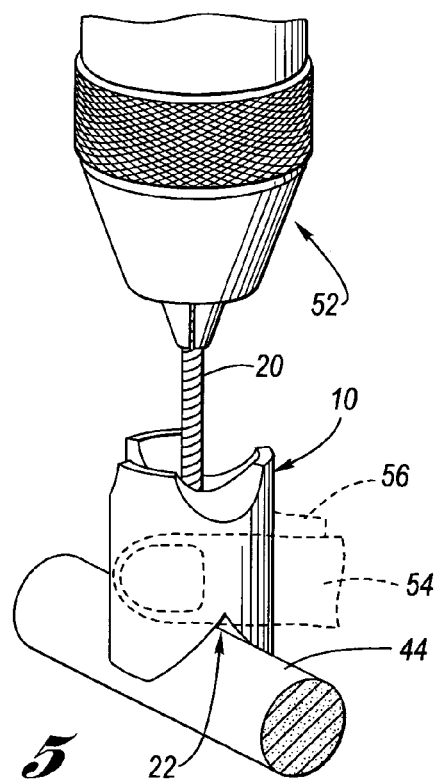

DRILL BIT GUIDE FOR A HAND-HELD DRILL

TECHNICAL FIELD

The present invention relates to a guidance device for guidably orienting a bit of a hand-held (electrically powered) drill relative to a surface of an article to be drilled by the bit.

BACKGROUND OF THE INVENTION

Whenever a hole is drilled into an article, it is intended for the bit of the drill to enter the article at some predetermined angle of orientation with respect to the surface of the article. The precision with which the actual angle of orientation of the bit must be relative to the predetermined angle of orientation depends upon each application, and can vary from high accuracy to just approximate accuracy.

In the majority of cases, the drilling of a hole at a precisely accurate orientation angle is accomplished using a drilling fixture, as for example a drill press, which exactly provides the predetermined orientation of the of the drill bit with respect to the surface of the article being drilled. The task of providing an accurate drill hole, however, becomes difficult if the drill is hand-held and the drilling is to be performed without the assistance of a drilling fixture. Hand-held drills are extremely ubiquitous, and are used for a plethora of small jobs around the shop or house. Most frequently, the need is to drill holes which are exactly perpendicular to the surface of an article to be drilled by a hand-held drill. And, what further complicates the precision of such perpendicular drilling is that the surface involved may not be flat, as for example a corner, or a curved surface.

The need for an auxiliary fixture enabling the drilling of holes at a specified angle to the work surface using a hand-held electric drill has been long recognized. One common approach is to attach a hand held electric drill to a fixture having a base that can be position on the work surface. The top of the fixture holding the drill can be tilted with respect to its base to set the desired angle, thus tilting the drill to the same angle. In addition, the fixture allows the affixed drill to freely slide along the length of the fixture. The drill is pushed toward the work surface and drills a hole at the preset angle. Examples of this general concept are disclosed in U.S. Pat. Nos. 2,831,376; 3,534,639; 3,890,058; 4,199,283; 4,391,558; and 4,842;453; wherein U.S. Pat. Nos. 4,199,283 and 4,391,558 provide examples of setting compound angles. Fixtures based on this concept are large, complex, cumbersome and not applicable to small surfaces. Also, they can be more expensive than the hand-held drill itself.

Another common basic concept represented in the prior art is a fixture clamped to the article to be drilled. The hand-held drill has a drill bit guided through a properly sized and tilted hole in the fixture. These fixtures are usually designed for specialized applications and are usable only with work pieces of a specific geometry. Examples of these fixtures are disclosed in e.g. U.S. Pat. Nos. 3,626,513; 4,257,166; 5,322,396 and 6,116,826.

Therefore, what remains needed in the art is a simple and inexpensive hand-held drill bit guide that can be conveniently used with electrically powered hand-held drills to provide a precisely perpendicular orientation angle with respect to the surface of an article to be drilled, wherein the surface may be flat, cornered or otherwise generally non-planar, e.g. convex, concave, cylindrical, etc.

SUMMARY OF THE INVENTION

The present invention is a simple and inexpensive hand-held drill bit guide that can be conveniently used with electrically powered hand-held drills to provide a precisely perpendicular orientation angle with respect to the surface of an article to be drilled, wherein the surface may be flat, cornered or otherwise generally non-planar, e.g. convex, concave, cylindrical, etc.

The drill bit guide according to the present invention is characterized by a guide body preferably in the form of a small cylinder, however, other shapes may be used. In the most preferred form of the drill bit guide, the guide body has first and second guidance members located, respectively, at the opposite ends thereof, wherein the first guidance member is in the form of groove and the second guidance surface is in the form of three mutually spaced apart legs; however, only one of the first and second guidance members may be present. A guidance hole extends entirely through the guide body, wherein the three legs are concentrically disposed with respect to the guidance hole, and wherein the guidance hole is bisectingly disposed with respect to the groove. The guidance hole serves as an orientation guide for a bit inserted thereinto, wherein the diameter of the guidance hole is predetermined to guidably receive thereinside a bit or bits of at least one predetermined diameter.

The first and second guidance members enable an accurate and secure placement of the drill bit guide onto surfaces of various shapes such that always the guidance hole will be oriented perpendicularly with respect to the surface.

The first guidance member is characterized by a symmetrically shaped groove having groove walls which have an angle of orientation relative to each other that results in an apex which is bisected by a centerline of the guidance hole, and wherein the angle of orientation of the groove walls bisects the centerline. The first guidance member is intended for being located upon, for example, a corner of an article or a cylindrically shaped surface of an article, such as for example a metallic rod or a wooden dowel. The maximum width of the groove is, preferably, smaller than the diameter of the drill bit guide in order to provide, on opposite sides of the groove in distal relation to the apex, first end flat guidance surfaces oriented parallel to a plane perpendicular to the centerline. The first end guidance surfaces provide stable placement upon flat surfaces. The angle subtending between the groove walls is preferably 90 degrees; however, an additional benefit can obtained by making the angle gradual or step-wise increasing with distance from the apex toward the first end guidance surface. Preferably, a first end funnel-shaped depression is formed at the apex of the groove, centered on the guidance hole, which serves to guide bit entry into the guidance hole.

The second guidance member is characterized by three legs of equal size, each leg terminating in a second end guidance surface, wherein the legs equidistantly circumscribe the guidance hole. Each of the second end guidance surfaces would most preferably be points, but are in practicality finite size surfaces, wherein the three second end guidance surfaces collectively define a plane perpendicular to the centerline. Preferably, a second end funnel-shaped depression is formed between the legs, centered on the guidance hole, which serves to guide bit entry into the guidance hole.

To help holding the drill bit guide stationary in the desired location on an interfacing surface of an article to be drilled, the first and second guidance members, or at least a portion thereof, are preferably provided with a slip and mar prevention cover, e.g. elastomeric coating or inserts. And, to prevent the bit from biting into, or ceasing-up with respect to, the drill bit guide, the guidance hole may be lined with a hardened sleeve, which may be rotatable with respect to the guide body.

To drill into an article at an angle perpendicular relative to its surface locally thereat, the user causes the bit of a hand-held (electrically powered) drill to be received through the guidance hole, and then places the tip of the bit at the intended drill location of the surface of the article to be drilled. Next, either the first or the second guidance member is brought into seated contact with the surface of the article and allowed to rest guidably thereupon. As a result, the user will have the bit in the proper location and perpendicularly oriented to the surface locally thereat. The hole can now be drilled into the article as the drill guide is held steady on the surface.

Accordingly, it is an object of the present invention to provide a drill bit guide for a hand-held electrically powered drill which is configured to provide an interfacial interaction with the surface of an article to be drilled such that the bit is oriented perpendicularly with respect to the surface at which drilling is to occur.

This and additional objects, features and advantages of the present invention will become clearer from the following specification of a preferred embodiment.

BRIEF DESCRIPTION OF THE DRAWINGS

FIG. 1 is a side elevational view of the drill bit guide according to the present invention.

FIG. 1A is a side elevational view of the drill bit guide as in FIG. 1 according to a first aspect of the present invention.

FIG. 2 is an end view of the drill bit guide, seen along line 2—2 of FIG. 1.

FIG. 2A is an end view of the drill bit guide as in FIG. 2 according to a second aspect of the present invention.

FIG. 3 is another end view of the drill bit guide, seen along line 3—3 of FIG. 1.

FIG. 4 is a sectional view of the drill bit guide, seen along line 4—4 of FIG. 3.

FIG. 5 is a perspective view of the drill bit guide according to the present invention, seen in operation with respect to a portion of a hand-held drill, a bit of the drill, and a cylindrically shaped surface of an article being drilled guidably therewith.

DESCRIPTION OF THE PREFERRED EMBODIMENT

Figure 6:
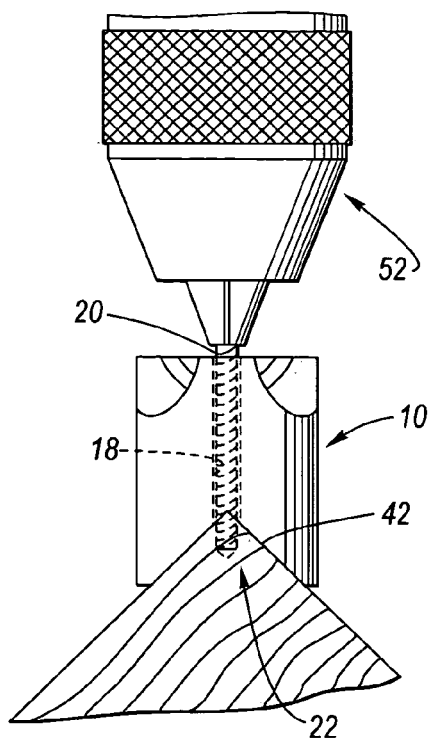
FIG. 6 is a perspective view of the drill bit guide according to the present invention, seen in operation with respect to a portion of a hand-held drill, a bit of the drill, and a corner of an article being drilled guidably therewith.

Referring now to the Drawing, FIGS. 1 through 4 depict various views and aspects of a drill bit guide 10 according to the present invention.

Figure 7:
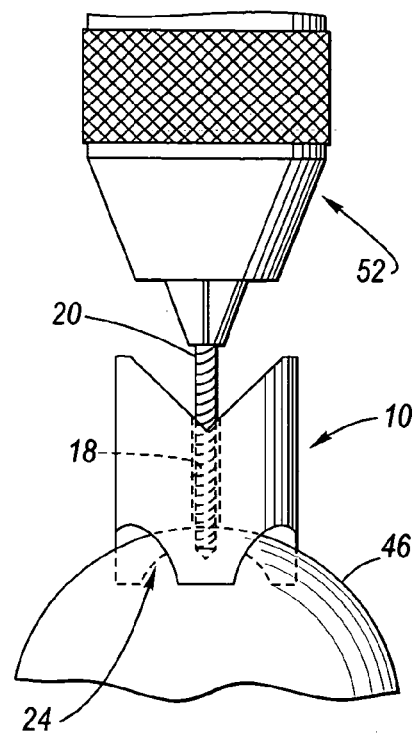
FIG. 7 is a perspective view of the drill bit guide according to the present invention, seen in operation with respect to a portion of a hand-held drill, a bit of the drill, and a spherically shaped surface of an article being drilled guidably therewith.
Figure 8A:
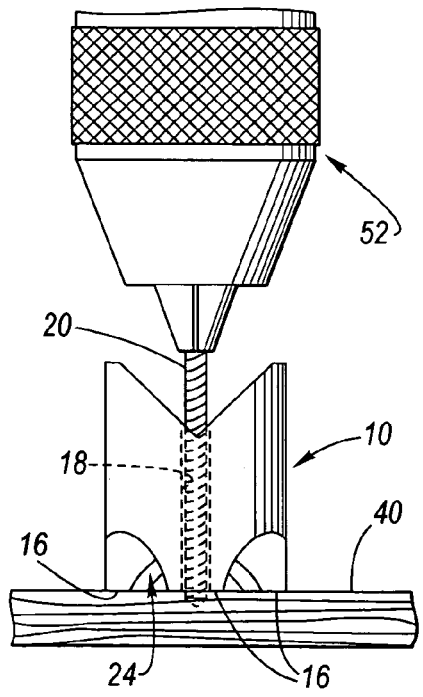
FIG. 8A is a perspective view of the drill bit guide according to the present invention, seen in a first aspect of operation with respect to a portion of a hand-held drill, a bit of the drill, and a flat surface of an article being drilled guidably therewith.
Figure 8B:
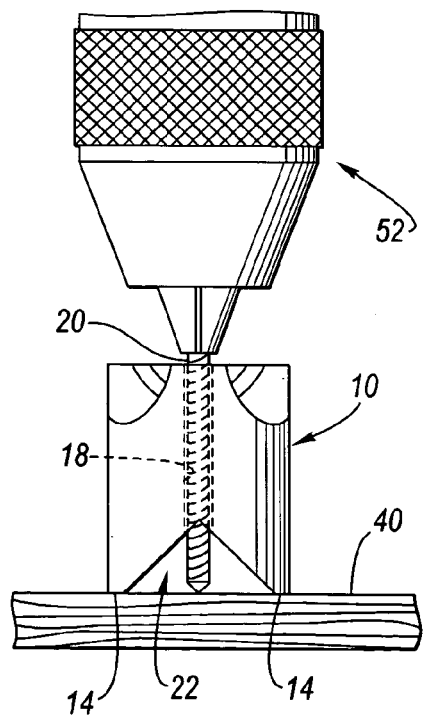
FIG. 8B is a perspective view of the drill bit guide according to the present invention, seen in a second aspect of operation with respect to a portion of a hand-held drill, a bit of the drill, and a flat surface of an article being drilled guidably therewith.

As can be understood from a comparative examination of FIGS. 1 through 4, the drill bit guide 10 has, preferably, a generally cylindrical guide body 12, however, the guide body may have other shapes, as for example the guide body 12' shown at FIG. 2A. The guide body 12 has, at opposing ends thereof, first and second guidance members 22, 24. A guidance hole 18 passes entirely through the guide body 12 in concentrically disposed relation to a cylindrical axis A of the guide body, and communicates with the first and second guidance members 22, 24. The guidance hole 18 provides an orientation guide for a bit 20 (as shown in FIGS. 5 through 8B) which is received thereinside. In this regard, the diameter of the guidance hole 18 is predetermined so as to be just slightly larger than a bit (or bits) which is guidably received thereinside, as for example 1/16 inch, 3/32 inch or 1/8 inch. Indeed, generally only a small diameter bit need be accommodated by the guidance hole 18, as the drilled hole thereby provides a pilot hole for subsequent drilling by another, larger diameter bit.

The first and second guidance members 22, 24 enable an accurate and secure placement of the drill bit guide 10 interfacingly and stably onto a surface of various shaped articles (see for example FIGS. 5 through 8B) such that always the guidance hole 18 will be oriented perpendicularly with respect to the surface.

As shown at FIGS. 1, 3 and 4, the first guidance member 22 is characterized by a symmetrically shaped groove 26 formed in the guide body 12, having two mutually opposing groove walls 26a, 26b which have an angle β relative to each other (see FIG. 4) such as to mutually form an apex 26c at a centerline C of the guidance hole 18, wherein the angle β bisects the centerline C, and wherein the centerline C preferably coincides with the cylindrical axis A.

Preferably, the maximum width of the groove 26 is smaller than the diameter of the guide body 12 such that first end guidance surfaces 14 are provided, wherein the first end guidance surfaces (which are preferably flat) mutually define a plane P oriented perpendicular to the centerline C (see FIG. 4). The angle β subtending between the groove walls 26a, 26b is preferably 90 degrees; however, an additional benefit can obtained by making the angle gradual or step-wise increasing with distance from the apex toward the first end guidance surface 14 (see for example the groove 26' of the guide body 12" shown at FIG. 1A).

As shown at FIGS. 1, 2 and 4, the second guidance member 24 is characterized by three identically sized legs 28a, 28b, 28c. Each leg 28a, 28b, 28c terminates in a second end guidance surface 16, wherein the legs are equidistantly spaced in circumscribing relation to the guidance hole 18 and equidistantly spaced from the centerline C. The second end guidance surfaces 16 are located at the terminus of the legs 28a, 28b, 28c, and whether in the form of points or finite size surfaces (as shown), the second end guidance surfaces collectively define a plane P' (see FIG. 4) oriented perpendicular to the centerline C and parallel to the aforementioned plane P. The legs 28a, 28b, 28c are preferably defined by: a) a second end funnel-shaped depression 30 formed at the second end of the guide body 12 between the legs 28a, 28b, 28c which is centered on the centerline C; and b) concave bights 32a, 32b, 32c, the bights being equidistantly spaced in concentric relation to the centerline C and the funnel-shaped depression 30 (see FIGS. 2 and 4).

At the first end of the guide body 12, a first end funnel shaped depression 34 may optionally be provided which is also centered on the centerline C. Both the second end funnel-shaped depression 30 and the first end funnel-shaped depression 34 serve to provide locating of a drill bit as it nears entry into the guidance hole 18. Additionally, to prevent the bit from biting into, or ceasing-up with respect to, the drill bit guide, the guidance hole 18 may be lined with a hardened sleeve 36, as shown by way of example at FIG. 2A; and, optionally, the sleeve may be rotatable with respect to the guide body.

The first guidance member 22 is intended to interface with, for nonlimiting example, a convex surface 44, such as for example a metallic rod or a wooden dowel (see FIG. 5) or a corner surface (see FIG. 6) by the groove 26 interfacing therewith in a stably seated manner. Additionally where present, the first guidance surfaces 14 allow for stable placement upon a flat surface 40 (see FIG. 8B).

The second guidance member 24 is intended to interface with a curved surface, as for example a convex spherical surface 46 (see FIG. 7) determined by an interface of the second guidance surfaces 16 touching thereupon. Additionally, the second guidance surfaces 16 allow for stable placement upon a flat surface 40 (see FIG. 8A).

To help holding the guide body stationary in the desired location on an interfacing surface of an article to be drilled, the first and second guidance members, or at least a portion thereof, are preferably provided with a slip and mar prevention cover 50 (see FIG. 1), e.g. elastomeric coating or inserts.

In operation of the drill bit guide 10, as shown generally at FIGS. 5 through 8B, to drill a hole into an article at an angle perpendicular relative to its surface locally thereat, the user holds the guide body 12 by hand, typically between the thumb 54 and first finger 56 (see FIG. 5) and causes the bit 20 of a hand-held (electrically powered) drill 52 to be received through the guidance hole 18, and then places the tip of the bit at the intended drill location of the surface of the article to be drilled. Next, one of the first and second guidance members 22, 24 of the drill bit guide is brought into interfaced seating contact with the surface and allowed to rest guidably thereupon. As a result, the user will have the bit in the proper location and perpendicularly oriented to the surface thereat. The hole can now be drilled into the article as the drill guide is held steady on the surface.

To those skilled in the art to which this invention appertains, the above described preferred embodiment may be subject to change or modification. For example, a drill bit guide may have a guide body which features only one of the first and second guidance members, wherein the opposite end may be of any configuration, preferably including a funnel-shaped depression for guiding entry of a bit into the guidance hole. Such change or modification can be carried out without departing from the scope of the invention, which is intended to be limited only by the scope of the appended claims.

The invention claimed is:

1. A drill bit guide for a hand-held drill comprising:
   a single piece guide body having a first end and an opposite second end, and further having a guidance hole extending through said guide body between said first and second ends, said guidance hole having a centerline;
   a first guidance member located at said first end; and
   a second guidance member located at said second end;
   wherein said first guidance member comprises a groove comprising a pair of groove walls forming an apex bisected by said centerline, said pair of groove walls having a predetermined angle of mutual orientation, wherein said angle bisects said centerline; and
   wherein said second guidance member comprises three legs which are mutually equally spaced apart in concentric disposition with respect to said centerline, each leg having a guidance surface at a respective terminus thereof, wherein the guidance surfaces collectively define a plane perpendicularly disposed with respect to said centerline, wherein a funnel-shaped depression is formed in said guide body at said second end between said legs and concentrically disposed with respect to said centerline, and wherein each said leg is defined by said funnel-shaped depression and further by a plurality of concave bights formed in said guide body.

2. The drill bit guide of claim 1, wherein said angle comprises substantially ninety degrees.

3. The drill bit guide of claim 1, wherein each groove wall is stair-stepped.

4. The drill bit guide of claim 1, further comprising a sleeve hardened with respect to a hardness of said guide body, said sleeve being disposed in said guidance hole.

5. The drill bit guide of claim 1, wherein said guide body is substantially cylindrically shaped.

6. The drill bit guide of claim 1, further comprising an anti-slip, anti-mar surface located at said first and second guidance members.

7. The drill bit guide of claim 1, further comprising first end guidance surfaces located adjoining said groove in distal disposition with respect to said apex, said first end guidance surfaces mutually defining a second plane oriented perpendicular to said centerline.

8. The drill bit guide of claim 4, wherein said sleeve is rotatable with respect to said guide body.

9. The drill bit guide of claim 4, wherein said angle comprises substantially ninety degrees.

10. The drill bit guide of claim 9, further comprising an anti-slip, anti-mar surface located at said first and second guidance members.

11. The drill bit guide of claim 10, further comprising first end guidance surfaces located adjoining said groove in distal disposition with respect to said apex, said first end guidance surfaces mutually defining a second plane oriented perpendicular to said centerline.

12. The drill bit guide of claim 11, wherein said guide body is substantially cylindrically shaped.

* * * * *